Feb. 21, 1939. T. DE PORT 2,147,638
MEANS FOR RIGGING AN AIRPLANE
Filed Dec. 9, 1932 2 Sheets-Sheet 1
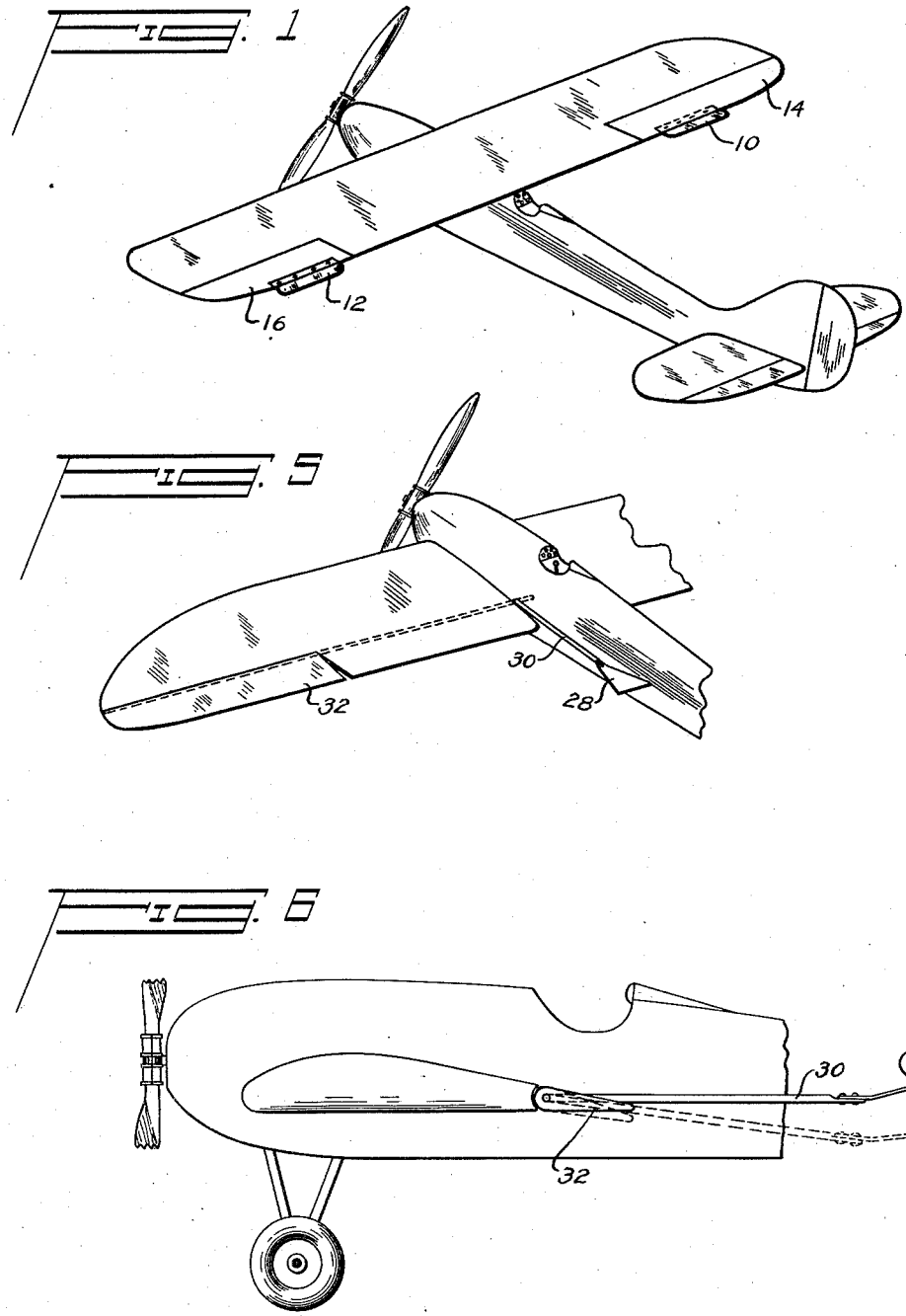

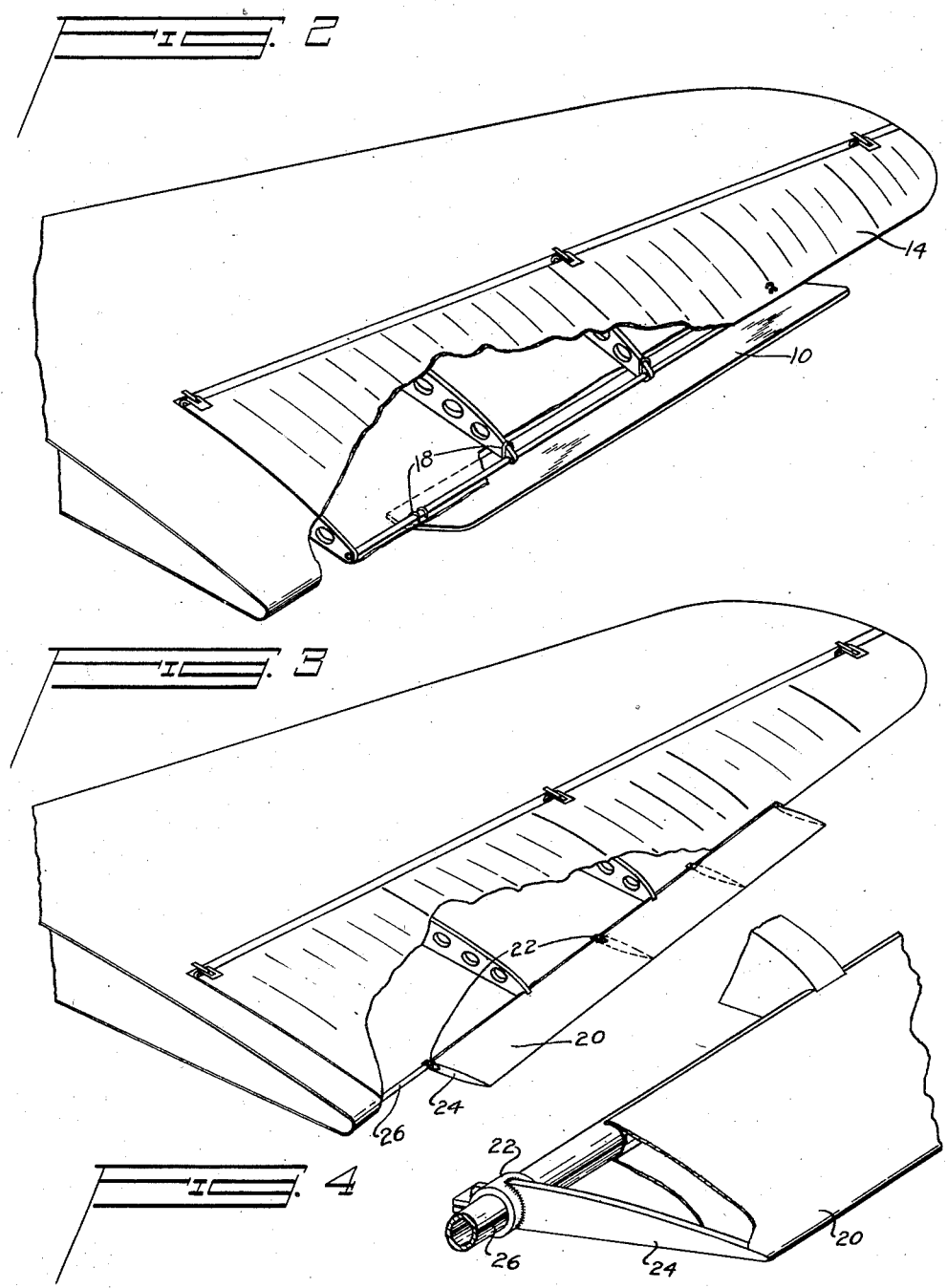

Patented Feb. 21, 1939

2,147,638

UNITED STATES PATENT OFFICE 2,147,638

MEANS FOR RIGGING AN AIRPLANE

Théophile de Port, New Carlisle, Ohio

Application December 9, 1932, Serial No. 646,477

2 Claims. (Cl. 244—82)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improved means for rigging airplane supporting surfaces, such as wing, stabilizers and the like, to compensate or correct for unsymmetrical forces acting on the airplane which are the result of inherent distortion or non-symmetry of the said surfaces, or which are due to the engine torque or the effect of slipstream.

It is a well-known fact that the tendency of flying with one wing lowered is due to the difference in the lift of both panels of a wing of an airplane and is caused by the non-symmetry of wing incidence, or that it is due to the engine torque. This results in a rolling moment in flight which must be constantly counteracted by the pilot through the action of the ailerons by applying a constant force of the controls. The application of this constant corrective force is extremely fatiguing to the pilot and therefore this condition existing on an airplane is undesirable.

Heretofore, in the case of externally braced wings, correction for the non-symmetry of wing air forces was accomplished by twisting the wing panels by altering the length of lift and landing wires or struts, thus changing the angle of incidence of the wing on one side relative to the other.

Prior to my invention, no effective provision was made for rigging of internally braced wings or wings of other construction not permitting the twisting of the wing. By rigging it is meant to compensate for unbalanced air forces due to unsymmetrical lift or due to the engine torque which manifests itself by wing "heaviness", the correction of which consists of application of a constant force by the pilot on the stick during the flight.

It is therefore the primary object of my invention to provide a novel means of correcting the unsymmetrical air forces tending to roll the airplane, without the intervention of the pilot and without disrupting the natural control of the airplane.

In accordance with my invention a relatively small flap is fixed with respect to the trailing edge of and at an angle to the movable control surface in such a manner that the angle of incidence of the control surface relative to the wing will be sufficiently changed to provide the necessary correction for effecting a balance of the air force for flight on even keel.

In one embodiment of my invention I fixedly attach a small flap to the trailing edge of an aileron and at an angle to the plane thereof so that in effect it constitutes a part of the aileron, the flap being adjusted so that the trailing portion thereof flares upward or downward depending upon whether it is desired to slightly lower or raise the aileron to correspondingly increase or decrease the effective angle of incidence of the zero lift chord or lift of the panel in flight.

In accordance with a still further embodiment of my invention, the flap is disposed rearward of and in spaced relation to the trailing edge of the panel and is fixedly attached to a member by which the aileron is actuated so that the aileron and flap are moved in unison, the flap, of course, being initially adjusted, thus obtaining a change in the position of the aileron to provide the necessary correction for obtaining the desired lift, it being desirable to position the flap as close to the axis of the airplane as the construction of the airplane will permit so that the rolling effect of the flap on the airplane will be negligible.

A further embodiment of my invention contemplates in case of other than conventional ailerons the attaching of a small flap directly to the trailing edge of the wing panel and near the tip of the wing at an angle to the plane thereof with the trailing portion flared upwardly or downwardly to produce a variation in the camber of the wing throughout the length of the flap that the resultant lift in flight will be correspondingly increased or decreased to effect a balanced condition.

In the drawings:

Fig. 1 is a perspective view of an airplane showing the aileron control surfaces provided with flaps fixedly attached thereto;

Fig. 2 is an enlarged perspective view of the right-hand wing panel shown in Fig. 1 with parts broken away;

Fig. 3 is a view similar to Fig. 2 showing a variation in the manner of attaching the flap to the aileron;

Fig. 4 is an enlarged detail fractional view of the flap and its attaching means;

Fig. 5 is a fractional perspective view of an airplane in flight showing a further embodiment of my invention; and Fig. 6 is a side elevational view of the airplane shown in Fig. 5 with the flap and aileron shown in the operative position in dotted outline.

Referring to Figs. 1 and 2, which illustrate one embodiment of my invention, it will be observed that reatively small wing flaps 10 and 12 are fixedly secured to the trailing edges of ailerons 14 and 16 respectively, by any suitable means such as U bolts and nuts 18. These flaps are preferably made of sheet metal such as steel or aluminum, having linear dimensions such that the portion extending beyond the trailing edge of the aileron will when exposed to the airflow in flight correct for or neutralize the unbalanced effect.

Flap 12 is disposed on the upper surface of its corresponding aileron and the other flap 10 is disposed on the lower surface of its corresponding aileron and both flaps are positioned as far inwardly from the tip edge of the aileron as possible so that their effect upon the lateral control of the airplane compared to that of the ailerons will be negligible and also in order that their inherent rolling effect, that is, the rolling effect of the air forces acting on themselves, will be a minimum for this particular arrangement. The effective area of the flap 12 is such that it will produce by itself a rolling moment that is negligible. The size of the area will be readily appreciated by a comparison thereof with the size of the area of the aileron. As illustrated, the ratio of the area of the flap to the area of the aileron is less than the ratio of the area of the aileron to the area of one half the wing.

The unbalanced condition, which generally exists in airplanes due to inaccuracy in fabrication or due to the warping in service of the wing panels, or due to the engine torque or other reason, is determined by flying the airplane. The flap that in flight is attached to the aileron on the side of the "heavy" wing is bent upward an amount that will lower the aileron and therefore raise the heavy wing panel and effect a balanced condition. The flap having been so adjusted remains fixed relative to the aileron in flight. While this balancing of the wing panels may be accomplished by a single flap that is attached to either aileron and bent upward or downward depending upon whether it is necessary to respectively lower or raise the wing panel to which it is attached, it is obvious that the same may be accomplished, as shown in Fig. 1, by the use of two flaps, their relative upward and downward displacements depending upon the differential required to effect a balanced condition. By using two flaps the degree of adjustment of the control stick for centrally positioning the same after the balancing is effected is thereby minimized.

Fig. 3 shows a variation in the manner of attaching the flap to the aileron. According to the arrangement the flap 20 is formed in the shape of a relatively small airfoil that is provided with a plurality of clamps 22 that are rigidly secured by means of welding to the metal ribs 24 of the flap. The aileron framework is provided with a tubular trailing edge upon which is mounted the flap by means of the clamps 22. The flap as shown is constructed from a plurality of transverse ribs, and a covering of sheet metal that is folded back upon itself with the edges thereof at the forward edge of the flap secured in overlapping relation and arcuate in shape to conform with the tube 26.

A further modification of my invention is shown in Figs. 5 and 6, in which a flap or vane 28 rectangular or trapezoidal in shape may be formed from a piece of sheet metal and is attached to a connecting boom 30, which in turn is fixedly connected to a torque tube which actuates the aileron 32 by the control stick. This vane extends rearwardly of the trailing edge of the wing panel and is located close to the fuselage so that the vane may be disposed within the slipstream. Thus the necessary angular setting of the vane within this zone either upward or downward, depending upon whether it is desired to raise or lower the panel to which it is attached, will be effective to produce a balanced condition of the wing panels by the corrective portion of the aileron 32 and at the same time produce a negligible rolling effect of the airplane.

Although certain specific arrangements have been described for purposes of illustrating my invention, it will be understood that various changes and substitutions of parts may be made without departing from the spirit and scope of this invention.

What I claim and desire to secure by Letters Patent is:

1. In an airplane, a wing, a movable surface forming the outer part of the trailing edge of said wing adjacent each tip thereof for controlling the lateral balance of said airplane and a compensating flap formed of bendable material and attached to the trailing edge of either control surface, said flap extending rearwardly from said surface and being bendable to a suitable angle with respect to said surface to compensate for inherent asymmetry of said airplane and thereby effect a condition of lateral equilibrium of said airplane in flight.

2. In an airplane, a supporting panel having a predetermined angle of incidence of the zero lift chord, a compensating flap associated with the trailing edge of said panel at the tip end thereof, said flap being bendable and capable of being set to different angles of incidence with respect to said panel, the area of said flap being such as to produce a negligible rolling moment by itself, but being capable of effecting a compensating variation in said angle of incidence when under forces of air flow in flight.

THÉOPHILE DE PORT.